US009157497B1

(12) United States Patent
Magleby et al.

(10) Patent No.: US 9,157,497 B1
(45) Date of Patent: Oct. 13, 2015

(54) LAMINA EMERGENT TORSIONAL JOINT AND RELATED METHODS

(75) Inventors: Spencer P. Magleby, Provo, UT (US); Joseph O. Jacobsen, Pleasant Grove, UT (US); Larry L. Howell, Orem, UT (US)

(73) Assignee: Brigham Young University, Provo, UT (US)

( * ) Notice: Subject to any disclaimer, the term of this patent is extended or adjusted under 35 U.S.C. 154(b) by 0 days.

(21) Appl. No.: 12/916,110

(22) Filed: Oct. 29, 2010

Related U.S. Application Data

(60) Provisional application No. 61/280,230, filed on Oct. 30, 2009.

(51) Int. Cl.
*F16F 1/02* (2006.01)
(52) U.S. Cl.
CPC .................................... *F16F 1/027* (2013.01)
(58) Field of Classification Search
USPC .............. 403/291, 220, 120, 329, 52; 16/225; 267/154, 158–161, 163, 164
See application file for complete search history.

(56) References Cited

U.S. PATENT DOCUMENTS

| | | |
|---|---|---|
| 3,945,053 A | 3/1976 | Hillberry et al. |
| 4,267,608 A | 5/1981 | Bora, Jr. |
| 4,445,635 A | 5/1984 | Barr |
| 5,405,408 A | 4/1995 | Pitkin |
| 5,415,661 A | 5/1995 | Holmes |
| 5,733,285 A | 3/1998 | Errico |
| 5,772,661 A | 6/1998 | Michelson |
| 5,964,760 A | 10/1999 | Richelsoph |
| 6,045,552 A | 4/2000 | Zucherman et al. |
| 6,355,040 B1 | 3/2002 | Richelsoph |
| 6,379,354 B1 | 4/2002 | Rogozinski |
| 6,440,169 B1 | 8/2002 | Elberg et al. |
| 6,527,804 B1 | 3/2003 | Gauchet et al. |
| 6,540,785 B1 | 4/2003 | Gill et al. |
| 6,572,653 B1 | 6/2003 | Simonson |
| 6,579,320 B1 | 6/2003 | Gauchet et al. |
| 6,610,093 B1 | 8/2003 | Pisharodi |

(Continued)

FOREIGN PATENT DOCUMENTS

| | | |
|---|---|---|
| KR | 1020050080493 A | 8/2005 |
| KR | 1020060113318 A | 11/2006 |

(Continued)

OTHER PUBLICATIONS

Jeanneau et al.; "A Compliant Rolling Contact Joint and it's Application in a 3-DOF Planar Parallel Mechanism with Kinematic Analysis"; Proceedings of DETC'04, ASME 2004 Design Engineering Technical Conferences and Computers and Information in Engineering Conference; Sep. 28-Oct. 2, 2004; Salt Lake City, Utah USA. DETC2004-57264, 2004by ASME.

(Continued)

*Primary Examiner* — Daniel Wiley
(74) *Attorney, Agent, or Firm* — Thorpe North & Western, LLP

(57) ABSTRACT

A torsional joint assembly formed from a substantially planar material sheet comprises a plurality of contiguous segments. The contiguous segments include at least two, substantially parallel hinge segments, each being coupleable to a loading structure; and at least a first connecting element connecting the hinge segments one to another, the connecting element extending substantially orthogonally to the hinge segments.

16 Claims, 5 Drawing Sheets

(56) References Cited

U.S. PATENT DOCUMENTS

| | | | |
|---|---|---|---|
| 6,645,248 B2 | 11/2003 | Casutt | |
| 6,723,127 B2 | 4/2004 | Ralph et al. | |
| 6,793,678 B2 | 9/2004 | Hawkins | |
| 6,802,867 B2 | 10/2004 | Manasas et al. | |
| 6,811,567 B2 | 11/2004 | Reiley | |
| 6,863,688 B2 | 3/2005 | Ralph et al. | |
| 6,936,071 B1 | 8/2005 | Marnay et al. | |
| 6,949,123 B2 | 9/2005 | Reiley | |
| 6,964,666 B2 | 11/2005 | Jackson | |
| 6,966,910 B2 | 11/2005 | Ritland | |
| 6,974,478 B2 | 12/2005 | Reiley et al. | |
| 6,983,924 B2 * | 1/2006 | Howell et al. | 251/118 |
| 6,991,632 B2 | 1/2006 | Ritland | |
| 6,997,955 B2 | 2/2006 | Zubok et al. | |
| 7,029,475 B2 | 4/2006 | Panjabi | |
| 7,074,238 B2 | 7/2006 | Stinson et al. | |
| 7,093,827 B2 * | 8/2006 | Culpepper | 267/160 |
| 7,115,129 B2 | 10/2006 | Heggeness | |
| 7,144,369 B2 | 12/2006 | Bardy | |
| 7,144,396 B2 | 12/2006 | Shluzas | |
| 7,207,992 B2 | 4/2007 | Ritland | |
| 7,229,441 B2 | 6/2007 | Trieu et al. | |
| 7,326,210 B2 | 2/2008 | Jahng et al. | |
| 7,338,398 B2 * | 3/2008 | Whiting et al. | 474/46 |
| 7,361,196 B2 | 4/2008 | Fallin et al. | |
| 7,371,238 B2 | 5/2008 | Soboleski et al. | |
| 7,377,942 B2 | 5/2008 | Berry | |
| 7,445,635 B2 | 11/2008 | Fallin et al. | |
| 7,458,981 B2 | 12/2008 | Fielding et al. | |
| 7,476,238 B2 | 1/2009 | Panjabi | |
| 7,476,251 B2 | 1/2009 | Zucherman et al. | |
| 7,481,830 B2 | 1/2009 | Wall et al. | |
| 7,485,133 B2 | 2/2009 | Cannon et al. | |
| 7,485,134 B2 | 2/2009 | Simonson | |
| 7,485,146 B1 | 2/2009 | Crook et al. | |
| 7,491,218 B2 | 2/2009 | Landry et al. | |
| 7,491,238 B2 | 2/2009 | Arnin et al. | |
| 7,491,240 B1 | 2/2009 | Carver et al. | |
| 7,494,507 B2 | 2/2009 | Dixon et al. | |
| 7,537,615 B2 | 5/2009 | Lemaire | |
| 7,618,441 B2 | 11/2009 | Groiso | |
| 7,632,292 B2 | 12/2009 | Sengupta et al. | |
| 7,682,375 B2 | 3/2010 | Ritland | |
| 7,785,351 B2 | 8/2010 | Gordon et al. | |
| 7,909,877 B2 | 3/2011 | Krueger et al. | |
| 8,025,681 B2 | 9/2011 | Colleran et al. | |
| 8,118,840 B2 | 2/2012 | Trieu et al. | |
| 8,172,883 B2 | 5/2012 | Bowden et al. | |
| 8,308,770 B2 | 11/2012 | Moumene et al. | |
| 8,663,284 B2 | 3/2014 | Beger et al. | |
| 2002/0138077 A1 | 9/2002 | Ferree | |
| 2003/0171751 A1 | 9/2003 | Ritland | |
| 2004/0002708 A1 | 1/2004 | Ritland | |
| 2004/0073215 A1 | 4/2004 | Carli | |
| 2004/0176849 A1 | 9/2004 | Zubok et al. | |
| 2005/0085814 A1 | 4/2005 | Sherman et al. | |
| 2005/0101954 A1 | 5/2005 | Simonson | |
| 2005/0113924 A1 | 5/2005 | Buttermann | |
| 2005/0113927 A1 | 5/2005 | Malek | |
| 2005/0125065 A1 | 6/2005 | Zucherman et al. | |
| 2005/0149023 A1 | 7/2005 | Ritland | |
| 2005/0159818 A1 | 7/2005 | Blain | |
| 2005/0165487 A1 | 7/2005 | Muhanna | |
| 2005/0177156 A1 | 8/2005 | Timm et al. | |
| 2005/0240270 A1 | 10/2005 | Zubok et al. | |
| 2005/0261772 A1 | 11/2005 | Filippi et al. | |
| 2006/0009768 A1 | 1/2006 | Ritland | |
| 2006/0009850 A1 | 1/2006 | Frigg et al. | |
| 2006/0036240 A1 | 2/2006 | Colleran et al. | |
| 2006/0041314 A1 | 2/2006 | Millard | |
| 2006/0052784 A1 | 3/2006 | Dant et al. | |
| 2006/0084987 A1 | 4/2006 | Kim | |
| 2006/0184171 A1 | 8/2006 | Biedermann et al. | |
| 2006/0190079 A1 | 8/2006 | Istephanous et al. | |
| 2006/0206114 A1 | 9/2006 | Ensign | |
| 2006/0229608 A1 | 10/2006 | Foster et al. | |
| 2006/0229609 A1 | 10/2006 | Wang | |
| 2006/0240533 A1 | 10/2006 | Sengupta et al. | |
| 2006/0271047 A1 | 11/2006 | Jackson | |
| 2006/0271051 A1 | 11/2006 | Berrevoets | |
| 2007/0016193 A1 | 1/2007 | Ritland | |
| 2007/0028714 A1 * | 2/2007 | Lusk et al. | 74/490.07 |
| 2007/0043365 A1 | 2/2007 | Ritland | |
| 2007/0049936 A1 | 3/2007 | Colleran et al. | |
| 2007/0088440 A1 | 4/2007 | Eisermann et al. | |
| 2007/0179618 A1 | 8/2007 | Trieu et al. | |
| 2007/0191832 A1 | 8/2007 | Trieu | |
| 2008/0015588 A1 | 1/2008 | Hawkes | |
| 2008/0077246 A1 | 3/2008 | Fehling et al. | |
| 2008/0140075 A1 | 6/2008 | Ensign | |
| 2008/0183209 A1 | 7/2008 | Robinson et al. | |
| 2008/0195208 A1 | 8/2008 | Castellvi | |
| 2008/0195213 A1 | 8/2008 | Halverson et al. | |
| 2008/0312693 A1 | 12/2008 | Trautwein et al. | |
| 2009/0005819 A1 | 1/2009 | Ben-Mokhtar et al. | |
| 2009/0048631 A1 | 2/2009 | Bhatnagar et al. | |
| 2009/0099608 A1 | 4/2009 | Szczesny | |
| 2009/0228045 A1 | 9/2009 | Hayes et al. | |
| 2009/0259257 A1 | 10/2009 | Prevost | |
| 2009/0270921 A1 | 10/2009 | Krause | |
| 2010/0204732 A1 | 8/2010 | Aschmann et al. | |
| 2010/0211106 A1 | 8/2010 | Bowden et al. | |
| 2010/0217324 A1 | 8/2010 | Bowden et al. | |
| 2010/0217326 A1 | 8/2010 | Bowden et al. | |
| 2010/0217334 A1 | 8/2010 | Hawkes | |
| 2010/0222821 A1 | 9/2010 | Bowden et al. | |
| 2010/0222823 A1 | 9/2010 | Bowden et al. | |
| 2010/0241232 A1 | 9/2010 | Halverson et al. | |

FOREIGN PATENT DOCUMENTS

| | | |
|---|---|---|
| WO | WO 2004/071344 A2 | 8/2004 |
| WO | WO 2005/051243 A2 | 6/2005 |
| WO | WO 2005/107654 A1 | 11/2005 |
| WO | WO 2006127992 | 11/2006 |
| WO | WO 2008/070840 A1 | 6/2008 |
| WO | WO 2008/100891 A1 | 8/2008 |
| WO | WO 2010/096621 A2 | 8/2010 |
| WO | WO 2010/096829 A2 | 8/2010 |
| WO | WO 2010/108010 A2 | 9/2010 |

OTHER PUBLICATIONS

Halverson et al.; "Concepts for Achieving Multi-Stability in Compliant Rolling-Contact Elements"; Proceedings of IDETC/CIE 2007; ASME 2007 International Design Engineering Technical Conferences & Computers and Information in Engineering Conference; Sep. 24-28, 2007; Las Vegas, USA; DETC2007-34836.

Cannon et al.; "ComplaintRolling-Contact Elemnt Mechanisms"; Proceedings of IDETC/CIE 2005, 2005 ASME Design Engineering Technical Conferences & Computers and Information in Engineering Conference, Sep. 24-28, 2005; Long Beach, California, USA; DETC2005-84073.

Halverson et al.; Tension-Based Multi-Stable Compliant Rolling-Contact Elements: 13th National Conference on Mechanisms and Machines (NaCoMM-2007); IISc, Bangalore, India; Dec. 12-13, 2007.

Jacobsen et al.; "Components for the design of Lamina Emergent Mechanism"; Proceedings of IMECE 2007, 2007 ASME International Mechanical Engineering Congress and Exposition; Nov. 10-16, 2007; Seattle, USA.

Jacobsen et al.; "Mechanism and Machine Theory"; Mechanism and Machine Theory; 2009; pp. 2098-2109; vol. 44; Elsevier.

Stratton et al.; Force-Displacement Model of the Flexsure™ Spinal Implant; Proceedings of the ASME 2010 International Design Engineering Technical Conferences and Computers and Information in Engineering Conference IDETC/CIE 2010; Aug. 15-18; Montreal, Quebec, Canada.

U.S. Appl. No. 11/952,709, filed Dec. 7, 2007; Michael D. Ensign; office action.

(56) References Cited

OTHER PUBLICATIONS

PCT Application PCT/US2010/025101; filing date Feb. 23, 2010; David Hawkes; ISR mailed Sep. 27, 2010.
PCT Application PCT/US2007/086803; filing date Dec. 7, 2007; Michael D. Ensign; ISR mailed May 19, 2008.
PCT Application PCT/US2008/053661; filing date Feb. 12, 2008; Peter Halverson; ISR mailed Jun. 5, 2008.
PCT Application PCT/US2010/024674; filing date Feb. 19, 2010; Anton E. Bowden; ISR mailed Nov. 19, 2010.
PCT Application PCT/US2010/027826; filing date Mar. 18, 2010; Peter A. Halverson; ISR mailed Jan. 17, 2011.
U.S. Appl. No. 12/709,240, filed Feb. 19, 2010; Anton E. Bowden; office action issued Dec. 30, 2011.
U.S. Appl. No. 11/952,709, filed Dec. 7, 2007; Michael D. Ensign; office action issued Mar. 17, 2011.
U.S. Appl. No. 12/709,240, filed Feb. 19, 2010; Anton E. Bowden; office action issued Aug. 29, 2011.
U.S. Appl. No. 12/709,243, filed Feb. 19, 2010; Anton E. Bowden; office action issued Sep. 1, 2011.
U.S. Appl. No. 12/709,248, filed Feb. 19, 2010; Anton E. Bowden; office action issued Sep. 13, 2011.
U.S. Appl. No. 12/709,255, filed Feb. 19, 2010; Anton E. Bowden; office action issued Sep. 15, 2011.
U.S. Appl. No. 12/029,046, filed Feb. 11, 2008; Peter Halverson; office action issued Sep. 22, 2011.
U.S. Appl. No. 12/709,246, filed Feb. 19, 2010; Anton E. Bowden; office action issued Sep. 1, 2011.
U.S. Appl. No. 12/709,240, filed Feb. 19, 2010; Anton E. Bowden; office action dated Jul. 11, 2012.
U.S. Appl. No. 12/711,131, filed Feb. 23, 2010; David T. Hawkes; office action issued Jun. 4, 2012.
US Application 120/029,046; filed Feb. 11, 2008; Peter Halverson; office action issued Apr. 20, 2012.
U.S. Appl. No. 12/726,816, filed Mar. 18, 2010; Peter Halverson; office action issued Jan. 31, 2013.
PCT Application PCT/US2012/041360; filed Jun. 7, 2012; Eric Dodgen; International Search Report mailed Dec. 14, 2012.
U.S. Appl. No. 12/711,131, filed Feb. 23, 2010; David T. Hawkes; office action issued Dec. 26, 2012.
U.S. Appl. No. 12/726,816, filed Mar. 18, 2010; Peter Halverson; office action dated Oct. 11, 2013.
U.S. Appl. No. 12/709,240, filed Feb. 19, 2010; Anton e. Bowden; notice of allowance dated Oct. 15, 2013.
U.S. Appl. No. 12/709,240, filed Feb. 19, 2010; Anton E. Bowden; office action dated Apr. 22, 2013.

* cited by examiner

LAMINA EMERGENT TORSIONAL JOINT AND RELATED METHODS

PRIORITY

Priority is claimed of U.S. Provisional Patent Application Ser. No. 61/280,230, filed Oct. 30, 2009, which is hereby incorporated herein by reference in its entirety.

STATEMENT REGARDING FEDERALLY SPONSORED RESEARCH

Research leading to this application was sponsored, in part, through National Science Foundation Award No. CMMI-0800606.

BACKGROUND

Compliant joints, or flexures, gain their motion through the deflection of the joint material, rather than multiple joint surfaces rotating and/or sliding relative to each other. Because compliant joints are monolithic they have no backlash from joint clearances or friction from contacting surfaces. Energy is stored in the material as the joint flexes. This energy can then be used advantageously by designing the joint to exhibit desired force-deflection characteristics without additional springs.

Compliant joints are often used when creating multi-stable mechanisms capable of having two or more equilibrium positions. Although compliant joints exhibit many benefits, they are often limited in their range of motion, and are generally harder to design, than their rigid-body counterparts, due to the coupled motion and energy equations that govern their behavior.

Compliant mechanisms manufactured from sheet goods with motion out of the plane of manufacture have been classified as "lamina emergent mechanisms" (LEMs). While much work has been done in developing such compliant joints for micro and macro applications, prior solutions often exhibit a number of problematic attributes.

SUMMARY OF THE INVENTION

In accordance with one embodiment, the invention provides a torsional joint assembly formed from a substantially planar material sheet, including a plurality of contiguous segments. The plurality of contiguous segments can include at least two, substantially parallel hinge segments, each being coupleable to a loading structure; and at least a first connecting element connecting the hinge segments one to another, the connecting element extending substantially orthogonally to the hinge segments.

In accordance with another aspect of the invention, a compliant mechanism usable as a component of an auxiliary system is provided, including at least two loading structures, configured to receive or react to a loading force applied during operation of the ancillary system. A torsional joint assembly can be formed from a substantially planar material sheet. The joint assembly can include a plurality of contiguous segments, including: at least two, substantially parallel hinge segments, each being coupleable to or formed integrally with a loading structure; and at least a first connecting element connecting the hinge segments one to another, the connecting element extending substantially orthogonally to the hinge segments. The compliant mechanism can include at least two configurations: i) a first, substantially flat configuration in which the contiguous segments are coplanar; and ii) a second, biased configuration, in which the connecting elements are moved out of plane from the substantially flat configuration and the hinge segments are torsionally biased so as to apply a restoring force that tends to return the torsional joint assembly to the substantially flat configuration.

In accordance with another aspect of the invention, a method of forming a compliant mechanism for use in an ancillary system is provided, including: obtaining a substantially planar sheet material; forming from or in the sheet material at least two loading structures configured to receive or react to a loading force applied during operation of the ancillary system; forming from or in the sheet material a torsional joint assembly having a plurality of contiguous segments, including: at least two, substantially parallel hinge segments, each being coupleable to or formed integrally with a loading structure; and at least a first connecting element connecting the hinge segments one to another, the connecting element extending substantially orthogonally to the hinge segments.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Figure 1:
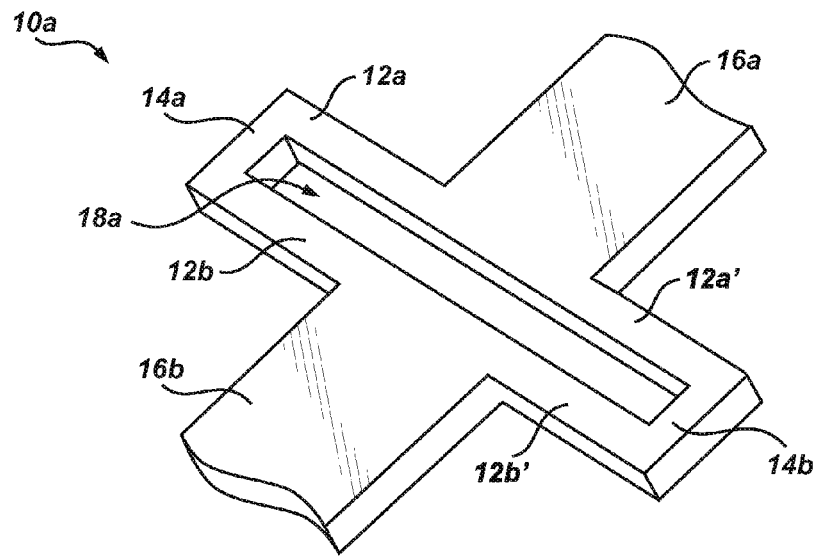
FIG. 1 is a perspective view of an "outside" torsional joint in accordance with an embodiment of the invention.

Reference will now be made to the exemplary embodiments illustrated, and specific language will be used herein to describe the same. It will nevertheless be understood that no limitation of the scope of the invention is thereby intended.

DETAILED DESCRIPTION OF EXEMPLARY EMBODIMENTS

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention.

In describing and claiming the present invention, the following terminology will be used.

As used herein, relative terms, such as "upper," "lower," "upwardly," "downwardly," "vertically," etc., are used to refer to various components, and orientations of components, of the systems discussed herein, and related structures with which the present systems can be utilized, as those terms would be readily understood by one of ordinary skill in the relevant art. It is to be understood that such terms are not intended to limit the present invention but are used to aid in describing the components of the present systems, and related structures generally, in the most straightforward manner.

As used herein, the term "substantially" refers to the complete or nearly complete extent or degree of an action, characteristic, property, state, structure, item, or result. As an arbitrary example, when an object or group of objects is/are referred to as being "substantially" symmetrical, it is to be understood that the object or objects are either completely symmetrical or are nearly completely symmetrical. The exact allowable degree of deviation from absolute completeness may in some cases depend on the specific context. However, generally speaking the nearness of completion will be so as to have the same overall result as if absolute and total completion were obtained.

The use of "substantially" is equally applicable when used in a negative connotation to refer to the complete or near complete lack of an action, characteristic, property, state, structure, item, or result. As an arbitrary example, an opening that is "substantially free of" material would either completely lack material, or so nearly completely lack material that the effect would be the same as if it completely lacked material. In other words, an opening that is "substantially free of" material may still actually contain some such material as long as there is no measurable effect as a result thereof.

Invention

The invention provides torsional joint assemblies and related methods that can be utilized in a variety of applications. While not so limited, the torsional joints presented herein are well suited for applications where large angular rotation is desired, but high off-axis stiffness is not as critical. Since the torsional joints can be fabricated from a single planar layer, they are well suited for macro and micro applications. The presented devices can be fabricated from materials as diverse as steel, polypropylene, and polycrystalline silicon, to name but a few.

Figure 2:
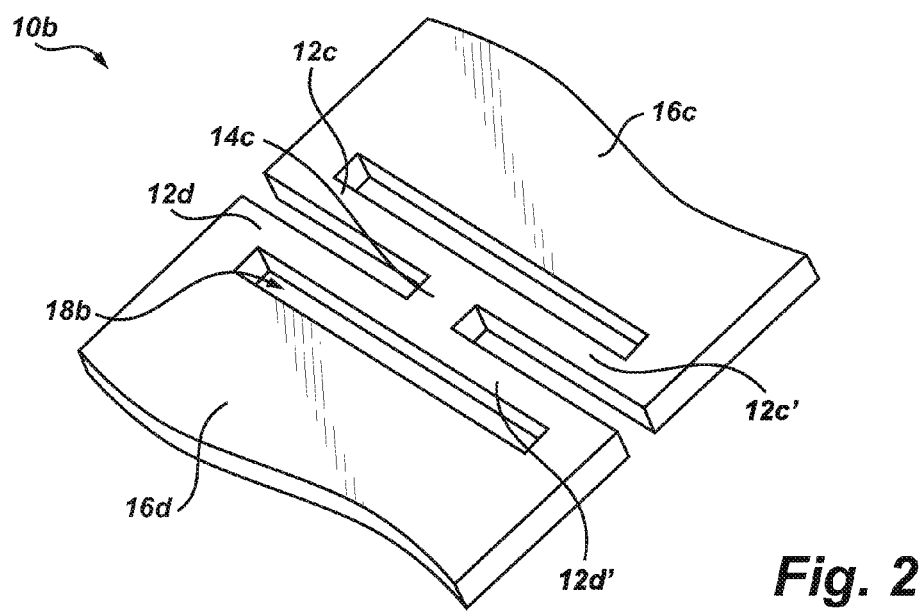
FIG. 2 is a perspective view of an "inside" torsional joint in accordance with an embodiment of the invention.

In accordance with one aspect of the invention, shown generally in FIGS. 1 and 2, the invention provides a torsional joint assembly (sometimes referred to herein as an Lamina Emergent Torsional joint, or "LET" joint) 10a, 10b formed from a substantially planar material sheet. The joint assembly can include a plurality of contiguous segments, including at least two hinge segments, 12a, 12b in FIG. 1 and 12c, 12d in FIG. 2. The hinge segments can be substantially parallel to one another, and can be coupleable to a loading structure (shown by exemplary beams 16a, 16b, 16c, 16d, etc.). At least one connecting element 14a, 14b, 14c, etc., can connect the hinge segments one to another. Typically, the connecting elements will extend substantially orthogonally to the hinge segments.

The joint assembly 10a illustrated in FIG. 1 can be referred to as an "outside" torsional joint, and can include two connecting elements 14a, 14b that extend from (or typically very near) opposing ends of the hinge segments 12a, 12b. The joint assembly 10b illustrated in FIG. 2 can be referred to as an "inside" torsional joint, and can include a single connecting element 14c that extends between hinge segments 12c and 12d, substantially bisecting each.

To add consistency to the terminology used herein, it is noted that the number of hinge segments in a particular torsional joint can be affected by the number of loading structures or elements (and/or connecting elements) present in the joint. For example, in the joint of FIG. 1, in the absence of loading structure 16a, hinge segments 12 and 12a' would effectively comprise a single hinge segment. In effect, coupling loading member 16a to the otherwise single hinge segment creates two parallel, and collinear, hinge segments in either side of the loading member. The same is true for the addition of (or inclusion of) connecting member 14c in FIG. 2, which bifurcates the set of hinge segments 12c and 12d, creating paired segments 12c and 12c' and 12d and 12d'.

In one embodiment of the invention, whether an inside or outside configuration is utilized, it can be advantageous to arrange the various segments (including the loading structures) so that the forces on the out-of-plane members are balanced, thus reducing the off-axis loading and parasitic motion. This can be done with the present torsional hinges by combining two hinge segments, with one on each side of the connecting element. Thus, the arrangement illustrated in FIG. 1 includes two collinear hinge segments 12a and 12a' that are parallel to collinear hinge segments 12b and 12b', which are separated by a gap 18a. The hinge segments 12a and 12a' act as springs in parallel. The hinge segments 12b and 12b' also act as springs in parallel. The set of segments 12a and 12a' collectively act as springs in series with the set of segments 12b and 12b'.

The two parallel sets of torsional hinges are connected by connecting elements 14a, 14b, 14c, etc. As the hinge actuates, these relatively short segments are loaded in bending, while the remainder of the joint undergoes torsion. The significance of this bending in the overall motion of the joint will typically depend on the stiffness of the connecting elements.

In the example shown in FIG. 2, the outside joint includes torsional hinges 12c, 12c', 12d, 12d' that do not extend beyond the width of the link. By arranging the joint with the torsional hinges on the inside, new connecting elements are introduced that are put into bending during hinge motion.

Figure 5:
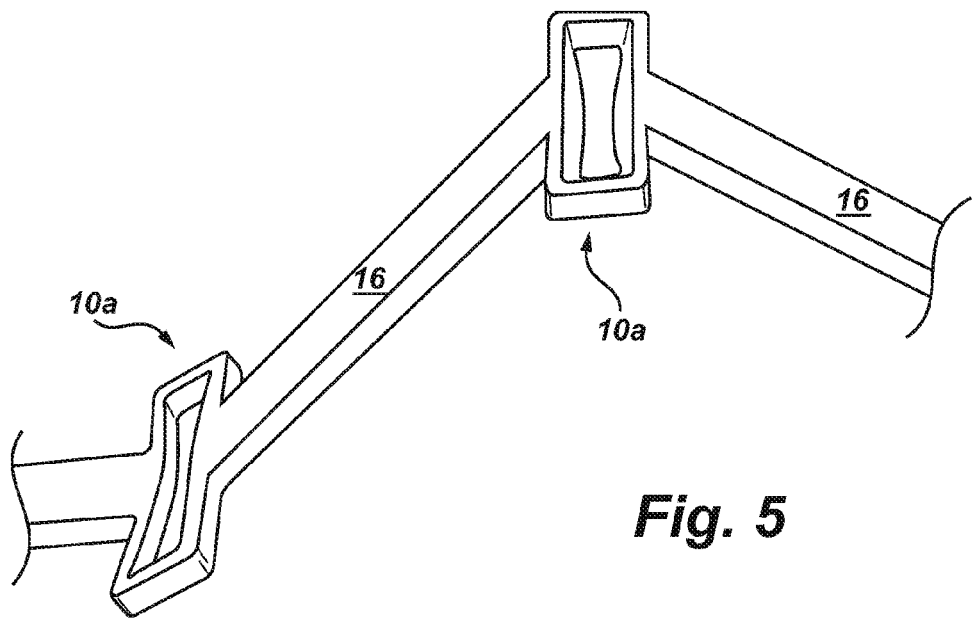
FIG. 5 is a perspective view of a pair of torsional joints joining two loading members or links.

Either the outside configuration (FIG. 1) or the inside configuration (FIG. 2) of the joint can be used for connecting links to ground or for a link-to-link connection, as shown by example in FIG. 5 (which utilizes the outside configuration). It some embodiments, it may not always be advantageous to use both sets of springs (e.g. set 12a and 12a' as well as set 12b and 12b' in FIG. 1): in this case, a "half" joint can be formed, which only uses two torsional hinges, connected in parallel.

The symmetric nature of the torsional joints of the present invention allows each torsional hinge to undergo less deflection than the total motion of the joint. This allows for lower stress in the torsional members or a larger rotation with the same stress level when compared to a single torsional hinge. The symmetric design also reduces off-axis loading on adjacent links. Torsional joints of the present invention have been demonstrated in macro and micro applications, including devices made from several different materials. The present systems have proven effective when implemented with material sheets having a thickness as little as 0.1 inches and less. Thicknesses on the order of 10 μm or less have also been utilized successfully.

Figure 6:
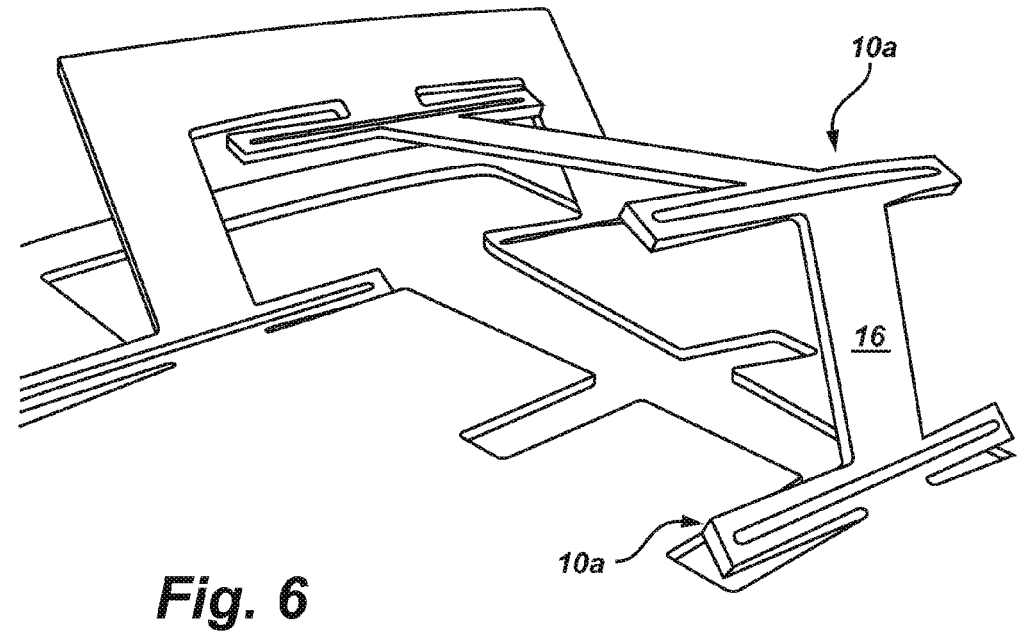
FIG. 6 is a perspective view of a compliant mechanism having motion similar to a planar four-bar linkage.

The joint assemblies (and compliant mechanisms in which they are utilized) will typically include at least two configurations: i) a first, substantially flat configuration in which the contiguous segments are coplanar; and ii) a second, biased configuration, in which the connecting elements are moved out of plane from the substantially flat configuration and the hinge segments are torsionally biased so as to apply a restoring force that tends to return the assembly to the substantially flat configuration. The assembly illustrated in FIGS. 5 and 6 generally includes loading members or elements 16 that lie in a generally flat, planar condition when unloaded. When in a loading condition, the elements 16 extend in a plane substantially orthogonal to the flat, "resting" plane of the assembly. This out of plane extension causes the hinge segments to coil and store a restoring, torsional force which tends to return the loading members to the flat, or relaxed, position.

Figure 7:
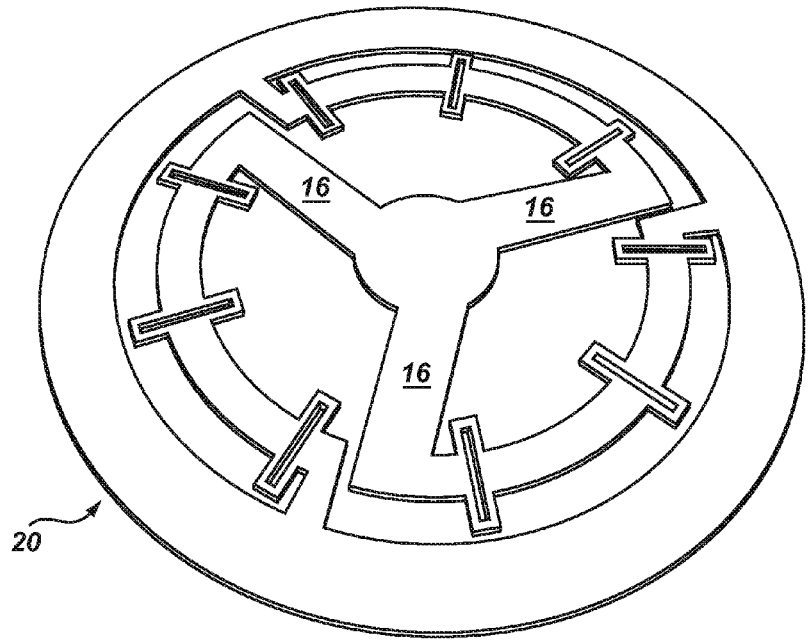
FIG. 7 is a perspective view of a spherical compliant mechanism utilizing a plurality of the torsional joints of the present invention, shown in a relaxed, or nominal, condition.
Figure 8:
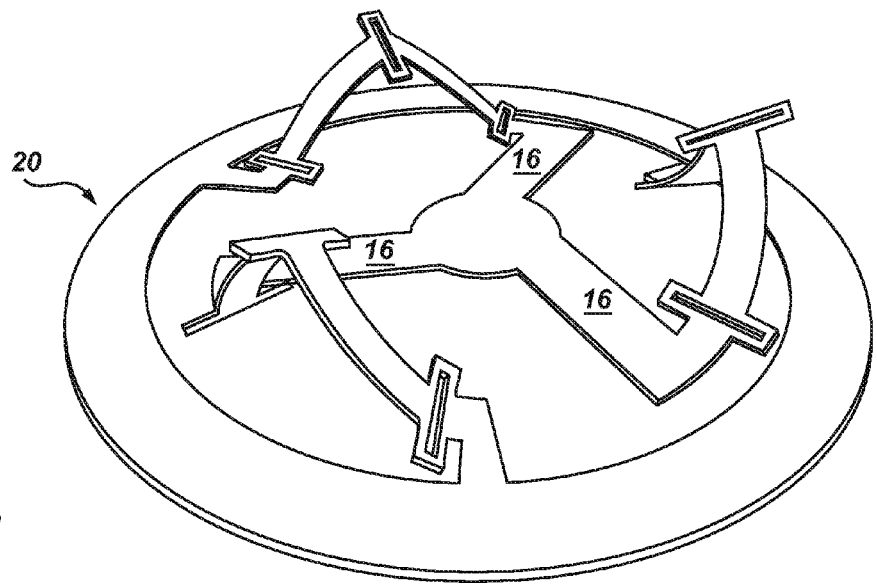
FIG. 8 is a perspective view of the spherical compliant mechanism of FIG. 7, shown in an actuated position.

In the embodiment illustrated in FIGS. 7 and 8, the torsional joints are utilized in a spherical compliant mechanism. An array of three spherical slider-crank mechanisms can be arranged symmetrically to balance the forces and create the desired geometry. All three spherical slider crank mechanisms can be simultaneously actuated with a single input. Each slider crank mechanism can contain three torsional joints for a total of nine joints in the mechanism. The mechanism is illustrated in FIG. 7 in a substantially flat, relaxed configuration. In FIG. 8, the actuated, or loaded, configuration of the spherical mechanism is shown.

Stiffness modeling of systems utilizing the present joints can be accomplished in a number of manners. In one example, the force-deflection characteristic for a LET Joint is found by combining all of the individual spring constants into a single equivalent spring constant, $k_{eq}$, such that $$T = k_{eq}\theta \quad (1)$$

where T is the total torque on the joint, $k_{eq}$ is the equivalent spring constant and $\theta$ is the angle of rotation of the joint, in radians.

Figure 3:
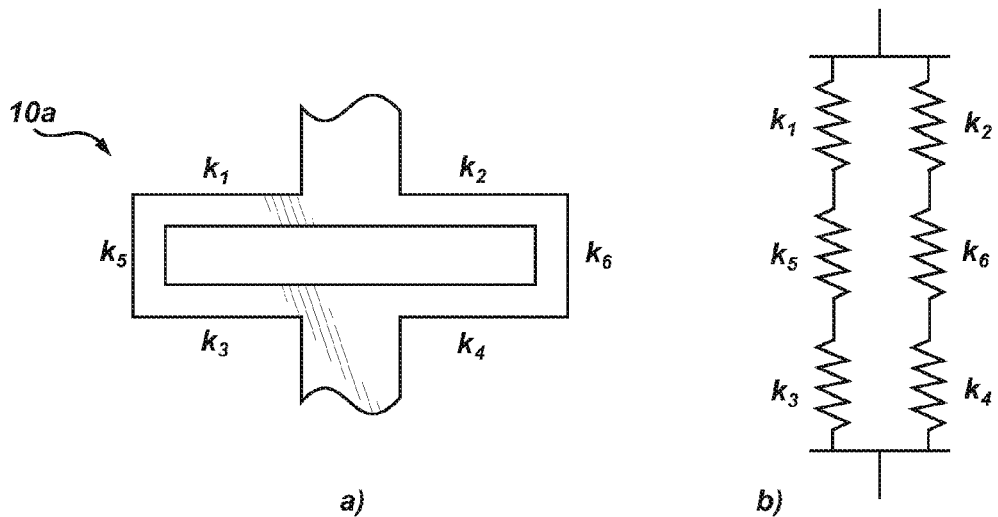
FIG. 3 includes a plan view of the torsional joint of FIG. 1, along with a diagram showing an analogous linear coil spring model of the joint.

To find the equivalent spring constant, $k_{eq}$, the elements in the LET joint will be combined using the appropriate spring system. FIG. 3 shows the LET joint with its individual spring constants labeled and the analogous spring system. Combining $k_1$, $k_3$, $k_5$ in series and $k_2$, $k_4$, $k_6$ in series, then combining those in parallel yields:

$$k_{eq} = \frac{k_1 k_3 k_5}{k_1 k_3 + k_1 k_5 + k_3 k_5} + \frac{k_2 k_4 k_6}{k_2 k_4 + k_2 k_6 + k_4 k_6} \quad (2)$$

Most applications will utilize a symmetric LET Joint where the torsional joints are equal ($k_1 = k_2 = k_3 = k_4$) and the connecting elements in bending are equal ($k_5 = k_6$). For this case, equation (2) reduces to:

$$k_{eq} = \frac{2k_T^2 k_B}{k_T^2 + 2k_T k_B} \quad (3)$$

where $k_T$ refers to the joints in torsion and $k_B$ to those in bending.

If all of the torsional joints are equal ($k_1 = k_2 = k_3 = k_4$) and $k_5$ and $k_6$ can be considered rigid, because their spring stiffness is much larger than that of the torsional joints, then equation (2) reduces to $$k_{eq} = k_T \quad (4)$$

where $k_T$ is the spring constant of one of the torsional joints. This result is convenient because the equivalent spring constant is the spring constant of one of the springs, but the deflection required by each torsional hinge was cut in half, also reducing the stress by half.

Figure 4:
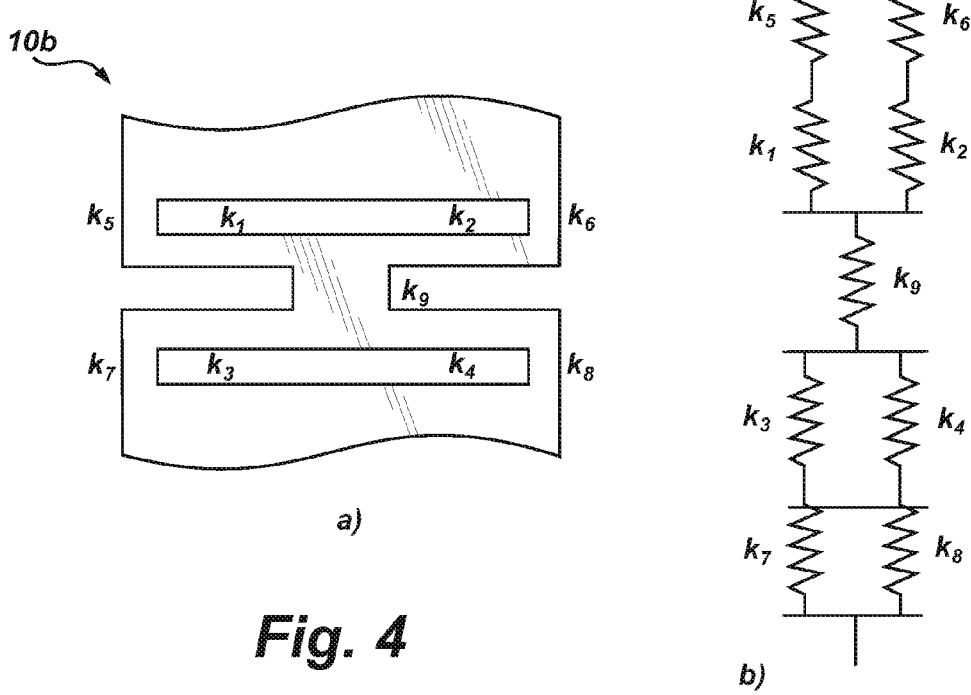
FIG. 4 includes a plan view of the torsional joint of FIG. 2, along with a diagram showing an analogous linear coil spring model of the joint.

A similar procedure leads to the equivalent spring constant for the inside LET joint. FIG. 4 shows the inside LET joint with its analogous spring system. The general form for the inside LET Joint's equivalent spring constant is:

$$\frac{1}{k_{eq}} = \frac{1}{\frac{k_1 k_5}{k_1 + k_5} + \frac{k_2 k_6}{k_2 + k_6}} + \frac{1}{k_9} + \frac{1}{\frac{k_3 k_7}{k_3 + k_7} + \frac{k_4 k_8}{k_4 + k_8}} \quad (5)$$

If all of the torsional springs are equal ($k_1 = k_2 = k_3 = k_4$) and all of the segments in bending equal ($k_5 = k_6 = k_7 = k_8 = k_9$), then equation (5) becomes:

$$k_{eq} = \frac{k_T k_B}{5k_T 4k_R} \quad (6)$$

with $k_T$ referring to the joints in torsion and $k_B$ to those in bending.

If the links put into bending can be considered rigid and all of the torsional hinges have the same spring constant, then equation (5) reduces to:

$$k_{eq} = k_T \quad (7)$$

which is the same result as that for the outside LET joint in equation (4).

Various methods and equations have been proposed to model the torsional behavior of non-circular beams. Exact solutions have been determined for specific cross-sectional geometries and boundary conditions. The equations presented herein provide sufficient accuracy for most applications while remaining convenient enough for iterative design work. Each individual torsional spring constant can be found by:

$$k_T = \frac{K_i G}{L_i} \quad (8)$$

where $L_i$ is the length of the torsional segment, G is the modulus of rigidity, and $K_i$ is a parameter associated with the cross sectional geometry. $K_i$ is analogous to J, the polar moment of inertia, for circular cross-sections.

Multiple equations have been proposed to model rectangular cross-sectional geometries in torsion. The elasticity solution in terms of an infinite series was given by Saint-Vennant as:

$$K_i = wt^3 \left( \frac{1}{3} - \frac{64}{\pi^5} \frac{t}{w} \sum_{i=1,3,5,\ldots}^{\infty} \frac{\tanh\frac{iw\pi}{2t}}{i^5} \right) \quad (9)$$

where 'tan h' is the hyperbolic tangent function. Roark and Young gave an approximate equation for $K_i$, which can be expressed as:

$$K_i = wt^3 \left[ \frac{1}{3} - 0.21\frac{t}{w}\left(1 - \frac{t^4}{12w^4}\right) \right] \quad (10)$$

Lobontiu simplified Roark and Young's equation by neglecting the high-power term reducing it to:

$$K_i = wt^3 \left[ \frac{1}{3} - 0.21 \frac{t}{w} \right] \quad (11)$$

It should be noted that all the equations above require that the width dimension, w, is always larger than the thickness t (w>t). This is especially important when a variable cross-sectional beam is used, that would require the equation's variables to switch mid-beam, such as a tapered bar. It has been shown that the errors between the series solution and the errors of equation (10) are less than 0.5%.

The accuracy of Eq. (11) decreases as t/w approaches 1. Hearn proposed the following approximate equation:

$$K_i = \frac{2t^3 w^3}{7t^2 + 7w^2} \quad (12)$$

Because of the symmetric relation between t and w, this equation is not dependent on the relative magnitude of t and w. However, this advantage comes at a loss of accuracy in the equation (with errors up to 14%). Equation (10) is straightforward and accurate, and will be used for the remainder of this discussion. Given Equations (8) and (10), the spring constant for each individual torsional spring can be found.

The flexible segments put into bending can be modeled using the pseudo-rigid-body model (PRBM) as small-length flexural pivots. As a small-length flexural pivot, its individual spring constant, $k_B$, can be found as:

$$k_B = \frac{EI_B}{L_B} \quad (13)$$

where E is the modulus of elasticity, $I_B$ is the beam's moment of inertia, and $L_B$ is the length of the segment in bending. As no small angle assumptions are made in developing Eq. (13) it can accurately model both small and large deformations in the connecting elements. These individual spring constants are then used to find an equivalent spring constant using the most appropriate of Equations (2)-(4). This equivalent spring constant can be used with Equation (1) to find the force-deflection characteristics of the LET Joint.

The stress in each of the compliant segments can also be determined. The shear stress in a non-circular torsion bar can be modeled as:

$$\tau_{max} = \frac{T_i}{Q} \quad (14)$$

where $T_i$ is the torque in the individual torsion bar and Q is a geometry dependent factor.

For a rectangle, Q is:

$$Q = \frac{w^2 t^2}{3w + 1.8t} \quad (15)$$

Once again, the width dimension is always considered larger than the thickness (i.e. w>t). The max shear stress occurs on the surface of the beam at the midpoint of the longer side, w. To find $T_i$, the torque through each of the complaint segments must be determined. Springs in series experience the same load. For the outside and inside LET Joints, the following naming convention will be used for determining $T_i$: a subscript of R refers to the right-hand side of the joint, an L to the left-hand side of the joint. For an outside LET Joint, $k_R$ would represent the equivalent spring constant for the right-hand side of the joint (i.e. $k_2$, $k_4$, and $k_6$ joined in series). $k_L$ equals $k_1$, $k_3$, and $k_5$ joined in series. $T_L$ is the torque through springs $k_1$, $k_3$, and $k_5$, thus $T_1=T_3=T_5=T_L$. $T_R$ is the torque through springs $k_2$, and $k_6$, thus $T_2=T_4=T_6=T_R$. The fractions of the total torque T that $T_L$ and $T_R$ experience are given by:

$$T_L = \frac{k_L T}{k_{eq}} \quad (16)$$

$$T_R = \frac{k_R T}{k_{eq}} \quad (17)$$

If the outside LET Joint is symmetric (i.e. the segments in torsion are equal and the segments in bending are equal) the torque through the left and right half ($T_L$ and $T_R$) will be half of the total torque (T). In addition to the subscripts used above, T and B will also be used for top and bottom, respectively, in the inside LET Joint. Thus, $k_{LT}$ would refer to the equivalent spring constant for the left top (i.e. $k_1$ and $k_5$ joined in series) or $k_{RB}$ for right bottom (i.e. $k_4$ and $k_8$ joined in series). $T_{RT}$ refers to the torque through the top right (i.e. the torque through springs $k_2$ and $k_6$). $k_T$ is the equivalent spring constant for the four top springs, $k_1$, $k_2$, $k_5$, $k_6$, and $k_B$ is the equivalent spring constant for the four bottom springs, $k_3$, $k_4$, $k_7$, $k_8$. The torque through each of the springs can be found as follows:

$$T_1=T_5=T_{LT}, T_2=T_6=T_{RT}, T_3=T_7=T_{LB}, T_4=T_8=T_{RB},$$
$$\text{and } T_9=T \quad (18)$$

$T_{LT}$, $T_{RT}$, $T_{LB}$, $T_{RB}$ are given by $$T_{LT} = \frac{k_{LT} T}{k_T} \quad (19)$$

$$T_{RT} = \frac{k_{RT} T}{k_T} \quad (20)$$

$$T_{LB} = \frac{k_{LB} T}{k_B} \quad (21)$$

$$T_{RB} = \frac{k_{RB} T}{k_B} \quad (22)$$

where T is the total torque applied to the LET Joint. Given the appropriate torque, $T_i$, the stress in each of the members in torsion can be calculated using Equations (14) and (15). For the segments in bending, the stress can be found using $$\sigma_{max} = \frac{T_i c}{I} \quad (23)$$

where $T_i$ is the torque or bending moment on the segment, c is the distance from the neutral plane to the outer surface, and I is the segment's area moment of inertia. The max stress will occur on the outer surface of the segment.

If the forces actuating the LET Joint are not a pure moment or tangential to the beam at all times, parasitic motion of the joint could occur. Although this motion could be in any direction, the LET Joint may be prone to compression or extension of the joint. Ideally the LET Joint would have low torsional stiffness while maintaining high stiffness in the other directions. If this is the case, a small deflection model could be used to accurately predict the parasitic motion. However, with some LET Joint designs this compression/extension may be large and a model capable of predicting large deflections would be desired.

The pseudo-rigid-body model's (PRBM) fixed-guided beam is presented here as it is capable of modeling both scenarios but with increased accuracy as the compression/extension of the joint becomes more significant to overall joint motion. Compression/extension of the joint occurs as the torsional segments are placed into bending. The four torsional elements placed bending can be modeled using the PRBM as fixed-guided beams. If each of the torsional segments has the same geometry, and the short segments connecting the torsional segments can be considered rigid, the total joint stiffness in compression/extension will be equal to the stiffness of one of the beams. The spring constant for one of the fix-guided beams, $k_{fg}$, is $$k_{fg} = 2\gamma K_\theta \frac{EI}{L} \quad (24)$$

where c and $K_h$ are often approximated as c=0.85 and $K_h$=2.65, E is the modulus of elasticity, I is the beam's area moment of inertia, and L is the length of the fix-guided beam. The distance the LET Joint compresses/extends will be twice the displacement of one of the fix-guided beams. The distance the total joint compresses/extends is $$d = 2\gamma \sin(\Theta) \quad (25)$$

where $\Theta$ can be found using $$\cos(\Theta)\gamma LP = 4k_{fg} \quad (26)$$

where P is the compressive/tensile force on the joint, L is the length of the beam, and $k_{fg}$ is the spring constant for a fix-guided beam. The compression/extension of the joint will depend on the load direction and joint geometry.

Example

To illustrate and verify the proposed LET join and model, a spring steel (AISI 1095) LET Joint was designed, fabricated, and tested. FIG. 10 shows the different LET Joint parameters and Table 1 gives their values.

The following example determines the force-deflection characteristics and the stress in each of the members of the spring steel prototype. Because of the symmetry of the joint on two spring constants need to be calculated, one for the torsional segments and one for the segments in bending. The torsional spring constant for a single torsional element can be found using Equations (8) and (10). The modulus of rigidity (G) was found using a modulus of elasticity of 205 GPa (29,700 ksi) and a poisson ration of 0.29

$$\left(G = \frac{E}{2(1+v)}\right),$$

resulting in G=79.37 GPa (11,511 ksi). $K_i$=7.92×10⁻⁵ cm⁴ (1.90×10⁻⁶ in⁴) is found using $L_{TW}$ and the material thickness, where $L_{TW}$=w and thickness=t in Eq. (10). Using $K_i$, G, and the length of the torsion member, $L_{TL}$, $k_T$=2.26 N-m/rad (20.04 in-lbs/rad) is calculated using Eq. (8)

$k_B$ is found using Eq. (13) by substituting the modulus of elasticity, bending length ($L_{BL}$), and the moment of inertia, $$I = \frac{wt^3}{12} = 2.23 \times 10^{-5} \text{ cm}^4 \ (5.53 \times 10^{-7} \text{ in}^4),$$

, which results in $k_B$=3.56 N-m/rad (31.51 in-lbs/rad). The two spring constants can then be used in Eq. (3) to calculate the equivalent spring constant of
$k_{eq}$=1.72 N-m/rad (15.20 in-lbs/rad). The output torque is now easily found using Eq. (1). At 20° (0.34 rad) of joint rotation, the output torque is 0.60 N-m (5.31 in-lbs).

With the force-deflection now know it becomes important to determine the joint range of motion prior to yielding. The stress in the torsional segments is found using Eqs. (14), (15) and either Eq. (16) or Eq. (17). Using the material thickness and $L_{TW}$, Eq. (15) yields Q=9.90×10⁻⁴ cm³ (6.04×10⁻⁵ in³). Due to the elements in parallel of this LET Joint, the appropriate torque ($T_i$) through the torsional hinge will behalf of the total torque applied to the joint. At an angle of 20°, the stress calculated using Eq. (14) is $\tau_{max}$=303 MPa (43,914 psi). The stress in the sections in bending is found using Eq. (23). $T_i$ is again half of the total torque, the moment of inertia, I is the same as calculated above, and c is equal to half of the thickness. Substituting these into Eq. (23) yields $\sigma_{max}$=547 MPa (79,325 psi).

If a vertical force was acting on the join as the joint deflects some of the force would contribute to extension of the LET Joint. If the force had a moment arm of 10 cm (3.94 in) and the joint was deflected to 20°, the axial force (P) on the LET Joint can be found as follows:

$$P = \frac{T}{10 \text{ cm}} \sin(20°) = 2.05N (0.46 \text{ lbs}).$$

Figure 9:
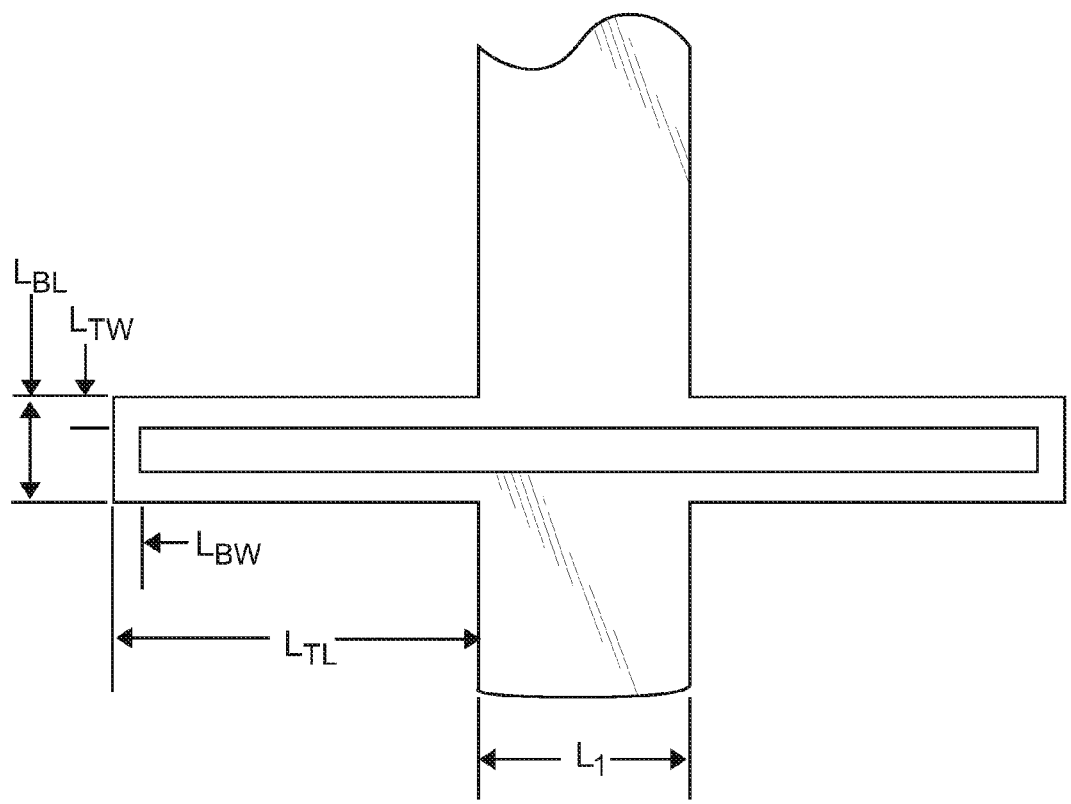
FIG. 9 illustrates an exemplary spring steel prototype configured in accordance with the present invention.

This can be used along with Eq. (24) to determine the pseudo-rigid-body angle $\Theta$ (illustrated in FIG. 9). With this angle and the torsion bar length ($L_{TL}$), Eq. (25) can be used to find the extension of the joint. Following these steps will yield: $k_{fg}$=2.71×10² N-m/rad (2.40×10³ in-lbs/rad), $\Theta$=0.0026°, and the total joint
extension d=2.11×10⁻⁴ cm (8.31×10⁻⁵ in). Therefore, for this loading condition, geometry, and material, very little joint extension occurs.

TABLE 1

| Variable | cm | in |
|---|---|---|
| $L_{TL}$ | 2.77 | 1.09 |
| $L_{TW}$ | 0.49 | 0.19 |
| $L_{BL}$ | 1.28 | 0.50 |
| $L_{BW}$ | 0.50 | 0.20 |
| $L_1$ | 2.55 | 1.01 |
| Thickness | 0.081 | 0.032 |

Testing of the spring steel LET Joint was performed by fixing the link on one end then displacing the link on the other side of the joint using a force transducer at a distance of 15.88 cm (6.25 in) from the center of the LET Joint. Two sets of data were acquired, and both sets of data were modeled based on the equations as illustrated in this section. The measured data correlated well with the model's prediction.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by any claims associated with this or related applications.

We claim:

1. A torsional joint assembly formed from a substantially planar material sheet, comprising:
   a plurality of contiguous segments, including:
     at least two, substantially parallel hinge segments, each being coupleable to a loading structure, at least one of the parallel hinge segments being coupled to a loading beam that divides the at least one parallel hinge segment into a pair of substantially collinear hinge segments; and
     at least a first connecting element connecting the hinge segments one to another, the connecting element extending substantially orthogonally to the hinge segments; wherein:
   the assembly includes at least two configurations: i) a first, substantially flat configuration in which the contiguous segments are coplanar; and ii) a second, biased configuration, in which the connecting elements are moved out of plane from the substantially flat configuration and the hinge segments are torsionally biased so as to apply a restoring force that tends to return the assembly to the substantially flat configuration.

2. The assembly of claim 1, further comprising a second connecting element connecting the hinge segments one to another, the second connecting element extending substantially parallel to the first connecting element.

3. The assembly of claim 2, wherein the first and second connecting elements extend from or adjacent opposing ends of the hinge segments.

4. The assembly of claim 1, wherein a thickness of the material sheet is less than about 0.1 inches.

5. The assembly of claim 4, wherein the thickness of the material sheet is less than about 10 µm.

6. The assembly of claim 1, further comprising a gap formed between the at least two substantially parallel hinge segments, the gap separating the hinge segments from contact with one another when the joint assembly is in a nominal, relaxed configuration.

7. The assembly of claim 6, wherein the hinge segments separate from one another when the joint assembly is in an actuated state.

8. The assembly of claim 1, wherein the pair of substantially collinear hinge segments each has substantially the same length.

9. The assembly of claim 1, wherein each of the parallel hinge segments is coupled to a loading beam that divides each of the parallel hinge segments into a pair of substantially collinear hinge segments.

10. A compliant mechanism installable as a component of an ancillary system, comprising:
    at least two loading structures, configured to receive or react to a loading force applied during operation of the ancillary system;
    a torsional joint assembly formed from a substantially planar material sheet, the joint assembly including:
    a plurality of contiguous segments, including:
      at least two, substantially parallel hinge segments, at least one of the parallel hinge segments being coupled to a loading beam that divides the at least one parallel hinge segment into a pair of substantially collinear hinge segments, each of the parallel hinge segments being coupleable to or formed integrally with one of the at least two loading structures; and
      at least a first connecting element connecting the hinge segments one to another, the connecting element extending substantially orthogonally to the hinge segments; wherein
    the compliant mechanism includes at least two configurations: i) a first, substantially flat configuration in which the contiguous segments are coplanar; and ii) a second, biased configuration, in which the connecting elements are moved out of plane from the substantially flat configuration and the hinge segments are torsionally biased so as to apply a restoring force that tends to return the torsional joint assembly to the substantially flat configuration.

11. The mechanism of claim 10, further comprising a second connecting element connecting the hinge segments one to another, the second connecting element extending substantially parallel to the first connecting element.

12. The mechanism of claim 11, wherein the first and second connecting elements extend from or adjacent opposing ends of the hinge segments.

13. The mechanism of claim 10, wherein the mechanism includes at least two torsional joint assemblies arranged linearly when the compliant mechanism is in the substantially flat configuration, the at least two torsional joint assemblies coiling about axes that are substantially parallel to a plane defined by the compliant mechanism when in the substantially flat configuration as the at least two loading structures move in a plane substantially orthogonal to the plane defined by the compliant mechanism when in the substantially flat configuration.

14. The mechanism of claim 10, wherein the mechanism comprises a spherical compliant mechanism that includes at least two torsional joint assemblies arranged radially about the mechanism, the at least two torsional joint assemblies cooperating to apply a rotational counterforce when loading structures of the compliant mechanism are rotationally actuated.

15. The assembly of claim 10, wherein the pair of substantially collinear hinge segments each has substantially the same length.

16. The assembly of claim 10, wherein each of the parallel hinge segments is coupled to a loading beam that divides each of the parallel hinge segments into a pair of substantially collinear hinge segments.

\* \* \* \* \*